United States Patent
Renaker et al.

(10) Patent No.: US 8,726,476 B2
(45) Date of Patent: May 20, 2014

(54) TIRE VALVE TOOL HAVING AIR COMMUNICATION MEANS

(71) Applicants: Robert Renaker, Sulphur, KY (US); Reva Renaker, Sulphur, KY (US)

(72) Inventors: Robert Renaker, Sulphur, KY (US); Reva Renaker, Sulphur, KY (US)

( * ) Notice: Subject to any disclaimer, the term of this patent is extended or adjusted under 35 U.S.C. 154(b) by 0 days.

(21) Appl. No.: 13/940,343

(22) Filed: Jul. 12, 2013

(65) Prior Publication Data

US 2014/0014197 A1    Jan. 16, 2014

Related U.S. Application Data

(60) Provisional application No. 61/671,897, filed on Jul. 16, 2012.

(51) Int. Cl.
*B25B 1/00*    (2006.01)

(52) U.S. Cl.
USPC ............................ 29/221.5; 29/270; 29/221.6

(58) Field of Classification Search
CPC ............ B25B 27/0007; B25B 27/0014; B25B 27/0057; B25B 27/02; B25B 27/24; B25B 27/302
USPC .......... 29/221.5, 213.1, 221.6, 227, 234, 238, 29/239, 255, 261, 270, 278, 280
See application file for complete search history.

(56) References Cited

U.S. PATENT DOCUMENTS

| | | | | |
|---|---|---|---|---|
| 1,296,279 A | * | 3/1919 | Friede | ................................. 7/100 |
| 1,389,667 A | * | 9/1921 | Kraft | .................................. 29/265 |
| 1,415,628 A | * | 5/1922 | Gielow | .............................. 7/100 |
| 1,548,755 A | | 8/1925 | Sattler | |
| 1,627,886 A | | 5/1927 | Cooley | |
| 2,123,524 A | * | 7/1938 | Colley | ....................... 137/315.41 |
| 2,228,984 A | * | 1/1941 | Broecker | ....................... 137/231 |
| 4,658,869 A | | 4/1987 | Soon-Fu | |
| 5,259,706 A | | 11/1993 | Gaut | |
| 5,915,740 A | * | 6/1999 | Weitner | ......................... 29/213.1 |
| 8,245,747 B2 | * | 8/2012 | Monjuvent et al. | ............ 152/427 |
| 2014/0014197 A1 | * | 1/2014 | Renaker et al. | ................ 137/231 |

\* cited by examiner

*Primary Examiner* — Lee D Wilson
(74) *Attorney, Agent, or Firm* — Daniel Boudwin; Global Intellectual Property Agency LLC

(57) ABSTRACT

A multipurpose tire valve tool is provided for the purposes of maintenance of a Schrader valve and for replacing the tube of a pneumatic tire. The tool comprises a valve core removal key, a valve stem tap arm, a first air inlet end, and a second valve stem attachment end. Through the body of the tool is an air conduit and an internal valve core post for depressing the same. A check valve along the air inlet end allows air to be communicated into the tool, whereby the air flows therethrough and into an attached Schrader valve for filling the tire tube while the tool is thereattached. The tool facilitates removal of the valve core, cleaning of the valve stem threads, and filling the tire or tire tube with air while the tool maintains the position of the valve stem through the rim.

2 Claims, 3 Drawing Sheets

TIRE VALVE TOOL HAVING AIR COMMUNICATION MEANS

CROSS REFERENCE TO RELATED APPLICATION

This application claims the benefit of U.S. Provisional Application No. 61/671,897 filed on Jul. 16, 2012, entitled "4 Way Air Tool." The above identified patent application is herein incorporated by reference in its entirety to provide continuity of disclosure.

BACKGROUND OF THE INVENTION

1. Field of the Invention

The present invention relates to a tire valve tool for replacing the valve core of a tire Schrader valve and filling a flat tire with air. More specifically, the present invention pertains to a new and improved, multi-function valve core tool that is capable of replacing a Schrader valve core in a pneumatic tire valve stem and thereafter filling the tire with air without requiring the user to remove the tool after the core has been installed.

Bicycle, motorcycle, and automobile tires are pneumatic vessels that are in contact with the ground during vehicle operation and influence the grip of the vehicle to the ground, the performance of the vehicle, and the comfort level of the vehicle over terrain. Most vehicle tires employ a Schrader valve as a means to contain the internal pressure within the tire, and further provide a user with the ability to readily add more air into the tire or release air therefrom. Careful control of tire pressure is very important for stability of the vehicle and safety of the vehicle occupants, particularly during periods of extended or intensive tire use. Monitoring and maintaining the appropriate tire pressure allows the tire to operate as efficiently as intended and to the peak performance as designed.

Since most tires are comprised of a rubber composite that is flexible and inflatable, vehicle tires are prone to puncture when impacted by external objects, when underinflated and overheated, or when otherwise mistreated, improperly utilized, or overly worn. For certain vehicle types, the pneumatic tire is a combination of an external tire casing and an inner tire tube that contains the pressurized air supporting the tire shape during use. If the tire is punctured and the inner tube cannot maintain its air pressure, the inner tube can be replaced and the external tire casing can be reused again after tube replacement.

When replacing a tire tube, the tube is placed within the tire casing and around the rim of the tire. The tire valve is fed through the rim of the tire for inflating the inner tube after the outer casing has been properly seated on the rim. However, during this process, the under-inflated tube can cause the valve to retreat into the rim before the user has had the opportunity to secure an air supply line to the valve for inflating the tire. When this happens, the user has to either fish for the valve stem within the tire interior, or remove the tire from the rim and start the installation process over again. This is both annoying and inefficient.

The present invention is submitted as a new and improved air valve tool that allows one to retain purchase of a Schrader valve stem during a tire inner tube installation procedure without requiring the user to release the valve stem when inflating the tire. Maintaining the position of the valve stem is important during tube replacement and when the valve core requires maintenance or replacement. The present invention therefore provides a multi-purpose valve tool that allows one to remove a Schrader valve core, clean the internal and internal threads of the valve stem using a tap and threaded base, as well as provide a means to support the valve stem by its threading while communicating air therethrough.

2. Description of the Prior Art

Devices have been disclosed in the prior art that relate to tire valve tools. These include devices that have been patented and published in patent application publications, and generally relate to tools that facilitate valve core replacement, valve stem repair, and valve stem maintenance. Most provide a threaded tool without a means to support the valve stem while filling the tire with air. However, there exist tools for such purposes but with diverging elements and structure than that of the present invention. The present invention discloses a new and novel air valve tool that allows for inflation of a tubed tire after installation or after tire valve maintenance, wherein the valve stem is supported while air is fed into the tire tube and through the disclosed tool.

The following is a list of devices deemed most relevant to the present disclosure, which are herein described for the purposes of highlighting and differentiating the unique aspects of the present invention, and further highlighting the drawbacks existing in the prior art.

One such device is U.S. Pat. No. 1,627,886 to Cooley, which discloses a valve tool that comprises a series axially aligned and threadably attached tools utilized for removing, cleaning, and installing the valve core of a Schrader valve. Three members, each having a first and second end, provide the user with a tap for cleaning the internal threads of a valve stems, a tapered member with left-hand threads for removing the valve core from the valve stem, a die for cleaning external threads of valve stem, and a socket wrench for removing the valve core. The Cooley device, while providing a novel valve core removal and installation tool, describes a structure that diverges from that of the present invention. The present invention pertains to a multi-function valve tool that also permits the user to fill the tire with air before removing the present tool from the repaired valve.

Another device is U.S. Pat. No. 1,415,628 to Gielow, which discloses a similar tool as Cooley but in a cross-configuration. The device comprises a threading rod having clamping jaws, a sleeve for use as a cleaning die for the valve-cap thread, a tap formed on the other end of the rod having threads to engage the inner threads of the valve stem, and a cross rod extending from the threaded rod to form a handle therefor and as a keyway to remove the valve core. The Gielow device is suitable for removing and reseating valve cores within the interior of a Schrader valve, while acting as a handled device suitable for turning the valve core within the stem. However, similar to the Cooley device, the Gielow device fails to provide a means of filling the tire through the tool when in use as provided herein.

Finally, U.S. Pat. No. 2,123,524 to Colley describes a tire valve tool that offers the aforementioned functions for removing, repairing, and replacing the valve core within a tire valve stem, however with the added capability of allowing a means of air communication through the body of the device. The Colley device includes a tubular body having a conduit therethrough and a valve seat and a spring-biased check valve at one end of the conduit. The check valve allows compressed air to be entered through the device and into the attached valve stem to inflate the tire. While similar in intent to the present invention, the present device includes an interior post member for depressing the valve core of the tire valve, facilitating air communication therethrough. The Colley device offers no means of pressing down the valve core for inflation and relies on air pressure to depress the same while inflating a tire.

The present invention is a new and novel air valve tool that offers a means of repairing a pneumatic tire Schrader valve, while also allowing the user to fill the tire with air without removing the tire after valve core replacement or after tire tube replacement. It is submitted that the present invention is substantially divergent in design elements from the prior art, and consequently it is clear that there is a need in the art for an improvement to existing tire valve tool devices. In this regard the instant invention substantially fulfills these needs.

SUMMARY OF THE INVENTION

In view of the foregoing disadvantages inherent in the known types of tire valve tools now present in the prior art, the present invention provides a new tire valve tool that can be utilized for providing convenience for the user when replacing a Schrader valve core or replacing the tube of a pneumatic tire.

It is therefore an object of the present invention to provide a new and improved tire valve tool device that has all of the advantages of the prior art and none of the disadvantages.

It is another object of the present invention to provide a tire valve tool that includes several functional elements for repairing or maintaining a Schrader valve on a pneumatic tire.

Another object of the present invention is to provide a tire valve tool that can remove and replace the valve core of a Schrader valve from the valve stem, clean the internal and external threading of the valve stem, support the valve stem when loosely placed through the rim, and finally filling the attached tire with air without removing the tool from the valve stem.

Yet another object of the present invention is to provide a tire valve tool that is X-shaped to facilitate hand tightening and loosening a tire valve core, and also facilitate cleaning of the tire valve stem threading using the hand wound thread taps of the tool.

Another object of the present invention is to provide a tire valve tool that includes an internal conduit and a spring biased check valve that allows air to be communicated through the tool when connected to the valve stem, whereby the user can maintain the position of the valve stem through the rim and fill the tire with air without removing the tool.

A final object of the present invention is to provide a tire valve tool that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
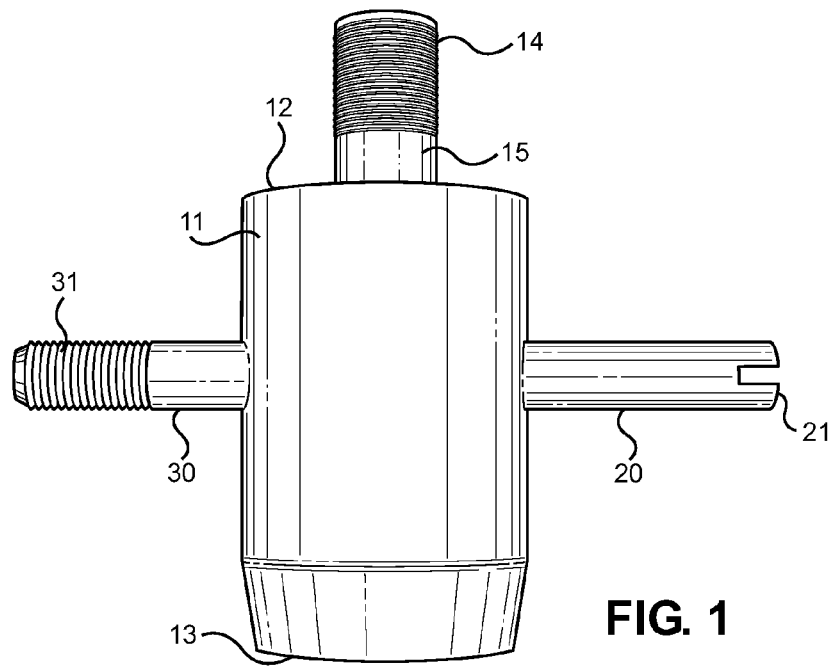
FIG. 1 shows a frontal view of the tire valve tool of the present invention.

Reference is made herein to the attached drawings. Like reference numerals are used throughout the drawings to depict like or similar elements of the tire valve tool. For the purposes of presenting a brief and clear description of the present invention, the preferred embodiment will be discussed as used for removing and replacing a valve core from within a Schrader valve stem, cleaning the threading thereof, and allowing the user to communicate air through the valve without first removing the tool. The figures are intended for representative purposes only and should not be considered to be limiting in any respect.

Referring now to FIG. 1, there is shown a frontal view of the tire valve tool of the present invention. The device comprises a tool body 11 having a first 12 and second 13 end, cylindrical sidewalls and an open interior conduit. Disposed on opposing sides of the body 11 are a valve core removal arm 20 and a valve stem tap arm 30. Both arms extend from the body 11 such that the elongated, cylindrical body and the opposing arms form an X-shaped tool that facilitates grasping of the tool and rotation thereof in the user's hand.

Along the first end 12 of the tool body 11 is an air inlet member 15 that includes an internal check valve and external threading 14 for attachment to an air hose or air supply means. The inlet 15 allows for connection of a compressed air line or air pump to the device for entering air into the tool interior conduit, whereby the air can be communicated through the tool body 11 and through its second end 13 while attached to a valve stem of a pneumatic tire. The tool second end 13 is adapted to secure to the exposed end of a tire valve stem and support the stem during tire tube replacement or valve core replacement, wherein the tool can remain attached to the valve stem to prevent it from retreating into the rim and air can further be communicated through the tool body 11 and into the tire without removing the tool.

The extended arms of the device include a first valve core removal arm 20 that is utilized to extend into the interior of a valve stem for removing its internal valve core. The arm 20 comprises an elongated member having a distal end keyway 21, wherein the keyway 21 connects to a slot in the valve core for unthreading the core from the within the valve stem and from its threaded seat therein. Once the valve core is removed, the valve stem internal threads can be cleaned using the valve stem tap arm 30 of the tool. The tap arm 30 includes a threaded 31 external surface for cleaning the threads of the valve stem, whereby any burrs or damage thereto can be removed and dirt can be removed therefrom. Finally, along the second end 13 of the tool is disposed valve stem female threading, whereby the tool second end 13 can support an exposed valve stem during tire tube replacement. Therefore, the tool facilitates valve core replacement and with supporting a valve stem through the rim of a tire during tire tube replacement.

Figure 2:
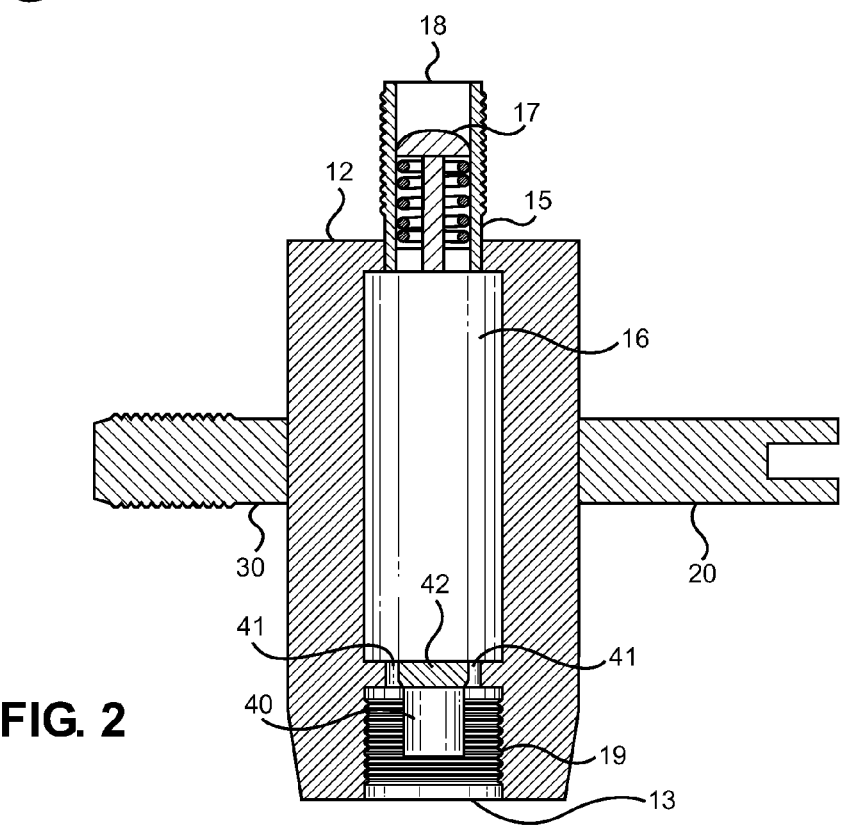
FIG. 2 shows a cross section view of the present invention.

Referring now to FIG. 2, there is shown a cross section view of the tool, whereby its internal components are highlighted. Within the tool body is an internal conduit 16 that allows for the passage of air therethrough. The first end 12 includes an air inlet member 15 that houses a spring biased check valve 17. The outer surface of the member 15 is threaded 10 to allow connection of an air supply nozzle thereto. Air is communicated through the opening 18 of the air inlet member 15, through the check valve 17 and into the tool body internal conduit 16.

Along the lower portion of the conduit 16, along the tool second end 13 is an internal shelf 42 that includes at least one aperture 41 therethrough. The apertures 41 allow the pressurized air within the conduit 16 to be evacuated through the tool second end 13. This end 13 is adapted to be threadably 19 connected to a valve stem, whereby the air can be communicated through the stem and into the tire interior. Below the shelf 42 is a downward-directed post 40, which depresses the check valve of the valve stem to allow for air to flow through the valve stem check valve. The interior threading 19 of the open second end 13 of the tool allows the tool to remain attached to the valve stem, whereby the first end check valve 17 effectively replaces the valve stem valve and the tool operates as a valve stem support and means of communicating air thereinto.

Figure 3:
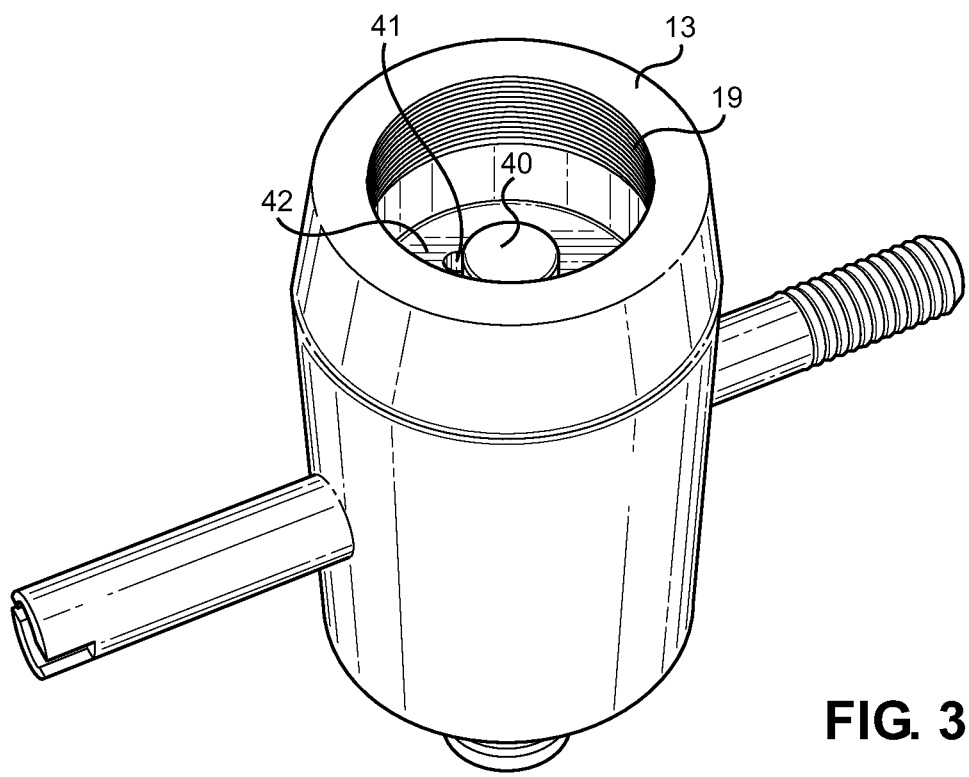
FIG. 3 shows a perspective view of the valve stem attachment end of the present invention.

Referring now to FIG. 3, there is shown a perspective end view of the present invention, showing the open second end 13 of the device. The second end 13 is adapted to connect to an exposed valve stem member of the pneumatic tire. The second end 13 comprises a depressed region having threaded 19 interior sidewalls and an internal shelf 42. Disposed on the shelf 42 is at least one aperture therethrough for communicating air from the tool interior conduit and into the attached valve stem. When attached to the valve stem, the upstanding post member 40 of the second end depresses the check valve of the valve stem to unseat the valve core and allow air to enter into the tire.

Figure 4:
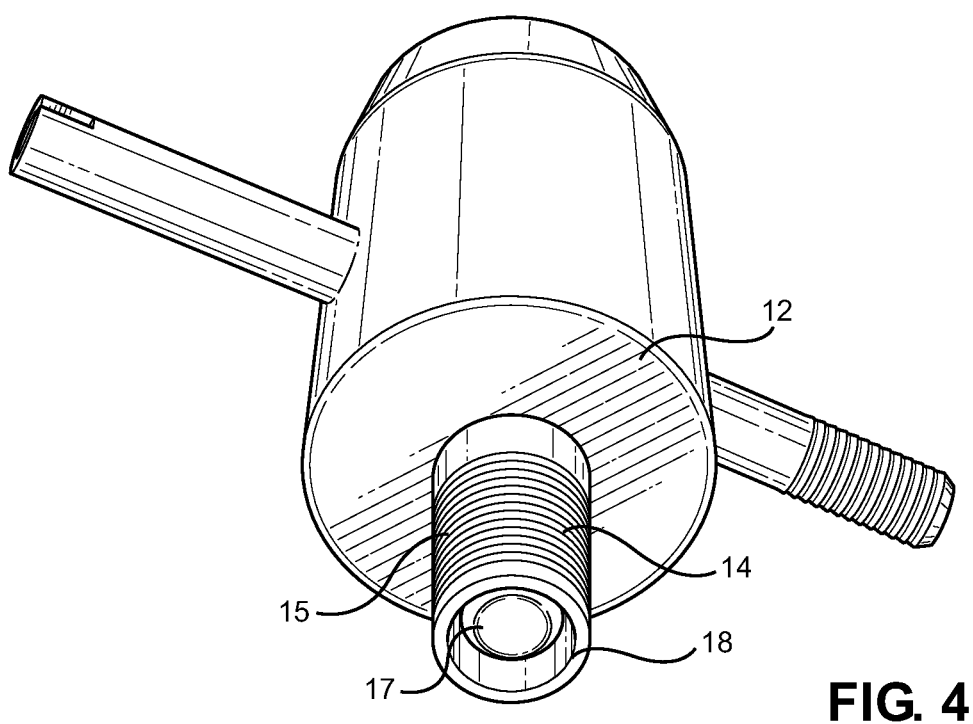
FIG. 4 shows a perspective view of the air pump attachment end of the present invention.

Referring now to FIG. 4, there is shown another perspective view of the tool, wherein the first end 12 of the tool is highlighted. At this first end 12, an air inlet member 15 is provided for connecting an air supply to the device when filling a tired thereattached. The air supply can be secured by way of the external threading 14 along the member 15, while an internal check valve 17 allows for the air supply to controllably enter air into the tool.

Figure 5:
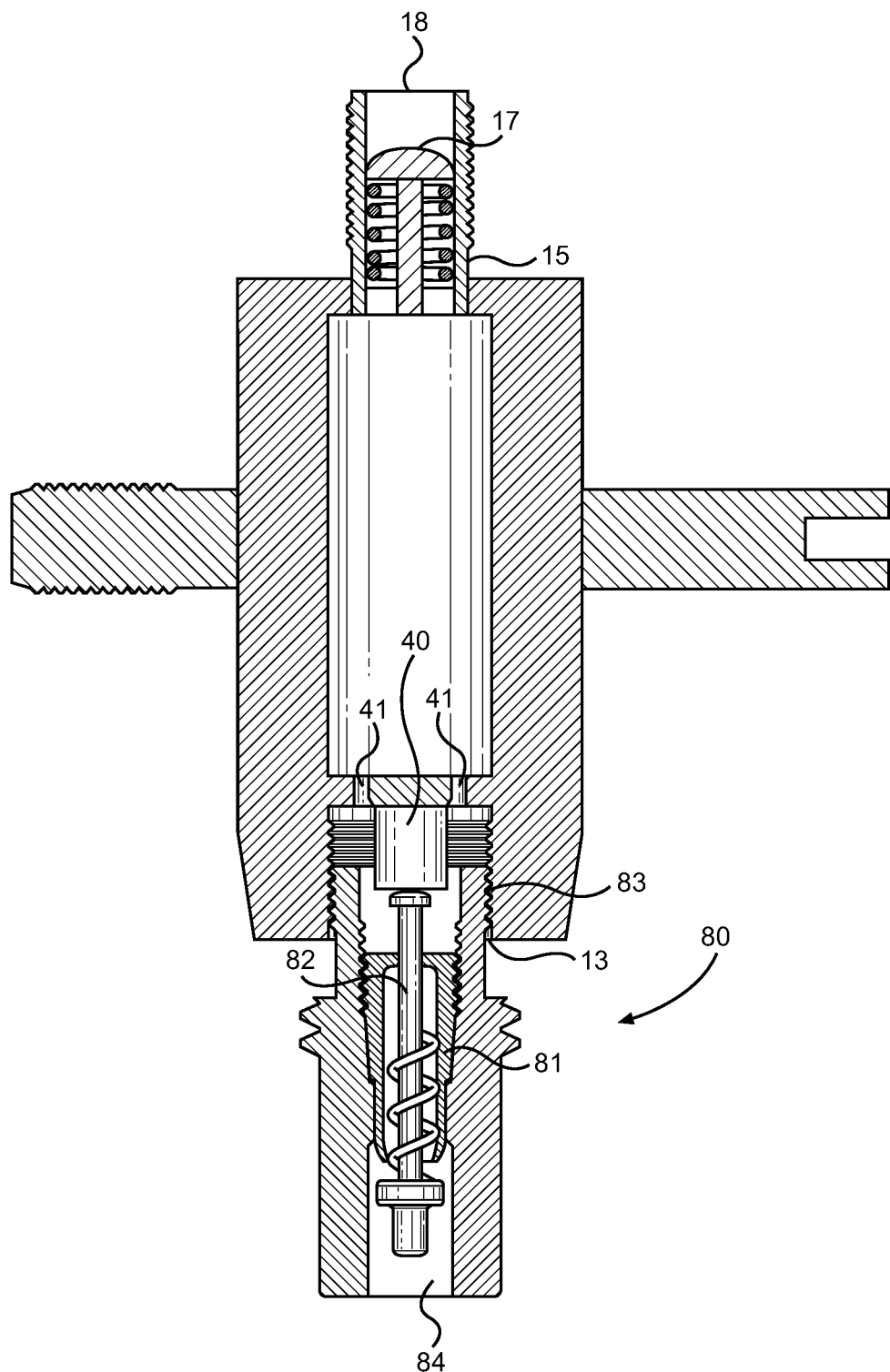
FIG. 5 shows a cross section view of the tool in connection with a Schrader valve.

Referring finally to FIG. 5, there is shown a view of the tire valve tool of the present invention in a working state, connected to a tire valve stem 80 and depressing its internal check valve 82 when filling the attached tire. In operation, the tool second end 13 threadably 82 attaches to the valve stem 80, supporting the valve stem 80 before the tire tube is filled, thereby preventing the stem 80 from retreating into the rim and causing the user to remove the tire casing to reseat the valve stem 80. When attached to the valve stem 80, the upstanding post member 40 of the device depresses the check valve member 82 of the valve stem 80. An air supply can then be attached to the tool air inlet member 15 to communicate air through the tool conduit, through the conduit apertures 41, through the second end 13 and into the valve stem interior 84. This fills the tire with air while the device is still attached to the valve stem 80, preventing the retreat of the valve stem 80 into the rim while also providing a means to communicate air therethrough. During maintenance of the valve stem 80, the vale core 81 can be replaced and its threaded attachment can be cleaned by the arms of the tool.

When inflating a tubed tire, a user has to maintain the valve stem as it seats through the rim of the tire. However, in a tire without sufficient air, the valve stem can retreat into the rim, making it difficult for a user to grasp it. Without access to the valve stem, the user cannot fill the tube with air and thus the user is either stranded or the user has to remove the tire casing to reseat the valve stem through the wheel rim. These options can be time consuming.

The present invention describes a combination tire valve tool. The device comprises a tool that provides different functionality with regard to replacing a tire onto a rim and securing a valve stem. One arm of the tool rethreads the inside of a valve stem. Another end of the tool includes a fitting for an air hose or air supply for inflating the tire. Another arm of the device is used for tightening and removing the valve stem core. Finally, the first end of the device provides a means to depress the check valve of the valve stem core, opening the valve stem for air entry therethrough while the tool is attached to the stem. This provides users with one tool that can replace a tire onto a rim, secure a valve stem, replace a valve core, and fill the tire with air. The device is ideal for bicycle tires having tubed tire configurations, and is designed as a multipurpose addition to anyone's tool box.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A tire valve tool, comprising:
   a tool body having a first end, a second end, and an internal conduit connecting said first and second end;
   a valve core removal arm and a valve stem tap arm extending outward from said tool body;
   said valve core removal arm comprising an elongated member having a distal end keyway;
   said valve stem tap arm comprising an elongated member having a threaded external surface;
   said tool body first end further comprising an air inlet member having an internal check valve and external threading;
   said tool body second end further comprising a depressed region having a threaded interior sidewall and an internal shelf;
   said internal shelf further comprising at least one aperture therethrough into said tool body internal conduit;
   said internal shelf further comprising an upstanding post member adapted to depress the check valve of a tire valve stem.

2. The device of claim 1, wherein said valve core removal arm and a valve stem tap arm are oppositely disposed on said tool body.

* * * * *